(12) United States Patent
Khan

(10) Patent No.: US 9,275,455 B1
(45) Date of Patent: Mar. 1, 2016

(54) METHOD FOR VESSEL EXTRACTION

(71) Applicant: Effat University, Jeddah (SA)

(72) Inventor: Mohammed Asmatullah Khan, Jeddah (SA)

(73) Assignee: EFFAT UNIVERSITY, Jeddah (SA)

( * ) Notice: Subject to any disclaimer, the term of this patent is extended or adjusted under 35 U.S.C. 154(b) by 0 days.

(21) Appl. No.: 14/590,595

(22) Filed: Jan. 6, 2015

(51) Int. Cl.
*G06K 9/00* (2006.01)
*G06T 7/00* (2006.01)
*G06T 5/00* (2006.01)
*G06K 9/52* (2006.01)
*A61B 5/02* (2006.01)

(52) U.S. Cl.
CPC .............. *G06T 7/0012* (2013.01); *G06K 9/52* (2013.01); *G06T 5/00* (2013.01); *G06T 2207/30101* (2013.01)

(58) Field of Classification Search
CPC ................................... A61B 5/00; G06K 9/00
USPC ............. 382/128–134; 378/4, 8, 21–27, 101, 378/901; 600/480, 485, 500, 505
See application file for complete search history.

(56) References Cited

U.S. PATENT DOCUMENTS

| 8,150,134 B2 * | 4/2012 | Lee | A61B 6/504 |
| | | | 382/130 |
| 8,428,323 B2 * | 4/2013 | Kim | G06T 5/003 |
| | | | 382/128 |
| 2012/0207402 A1 * | 8/2012 | Stojancic | G06F 17/30799 |
| | | | 382/260 |

OTHER PUBLICATIONS

Steering Committee, "The North American Symptomatic Carotid Endarterectomy Trial: Methods, Patient Characteristics, and Progress", North American Symptomatic Coarotid Endarterectomy Trial (NASCET), Stroke, vol. 22, No. 6, pp. 711-720, Jun. 1991.
European Carotid Surgery Trialists Collaborative Group, Abstract of "Randomised Trial of Endarterectomy for Recently Symptomatic Carotid Stenosis: Final Results of the MRC European Carotid Surgery (ECST)", Lancet 351, 1379-1387, 1999.
Truc et al., "Vessel Enhancement Filter Using Directional Filter Bank", Computer Vision and Image Understanding, vol. 113, pp. 101-112, 2009.
Zana et al., "Segmentation of Vessel-Like Patterns Using Mathematical Morphology and Curvature Evaluation," IEEE Transactions on Image Processing, vol. 10, No. 7, pp. 1010-1019, Jul. 2001.
Zhang et al., "Detecting Optic Disc on Asians by Multiscale Gaussian Filtering", International Journal of Biomedical Imaging, vol. 2012, Article ID 727154, Feb. 10, 2012.

(Continued)

*Primary Examiner* — Abolfazl Tabatabai
(74) *Attorney, Agent, or Firm* — Michael B. Fein; Eckert Seamans Cherin & Mellott, LLC

(57) ABSTRACT

A method for improving the detection of low-contrast and narrow width vessels comprising combining matched-filter responses with that of directional filter bank. A given vessel is characterized by having an elongated structure with a specific width and direction. Matched filters are designed in the form of elliptical second-order Gaussian derivatives at various scales, catering for vessels of widely varying widths. On the other hand, the directional filter bank helps in identifying the orientation of the vessels. Thus, combining both in complementary manner results is an improved response for vessels with varying width and varying direction. Results comparing this hybrid approach to matched filter and directional filter bank alone show substantial improvements both qualitatively and quantitatively.

8 Claims, 8 Drawing Sheets

(56) References Cited

OTHER PUBLICATIONS

Sofka et al., "Retinal Vessel Centerline Extraction Using Multiscale Matched Filters, Confidence and Edge Measures", IEEE Transactions on Medical Imaging, vol. 25, No. 12, pp. 1531-1546, 2006.

Miles et al., "Matched Filter Estimation of Serial Blood Vessel Diameters from Video Images", IEEE Transactions on Medical Imaging, vol. 12, No. 2. pp. 147-152, Jun. 1993.

Chaudhuri et al., "Detection of Blood Vessels in Retinal Images Using Two-Dimensional Matched Filters", IEEE Transactions on Medical Imaging, vol. 8, No. 3, pp. 263-269, Sep. 1989.

Hoover et al., "Locating Blood Vessels in Retinal Images by Piecewise Threshold Probing of a Matched Filter Response", IEEE Transactions on Medical Imaging, vol. 19, No. 3, pp. 203-210, Mar. 2000.

Jiang et al., "Adaptive Local Thresholding by Verification-Based Multithreshold Probing with Application to Vessel Detection in Retinal Images," IEEE Transactions on Pattern Analysis Machine Intelligence, vol. 25, No. 1, pp. 131-137, Jan. 2003.

Heneghan et al., "Characterization of changes in blood vessel width and tortuosity in retinopathy of prematurity using image analysis," Medical Image Analysis, vol. 6, No. 4, pp. 407-429, 2002.

Martínez-Pérez et al., "Retinal Blood Vessel Segmentation by Means of Scale-Space Analysis and Region Growing," Medical Image Computing and Computer-Assisted Intervention—MICCAI'99, vol. 1679, pp. 90-97, 1999.

Aylward et al., "Initialization, Noise, Singularities, and Scale in Height Ridge Traversal for Tubular Object Centerline Extraction", IEEE Transactions on Medical Imaging, vol. 21, No. 2, pp. 61-75, 2002.

Staal et al., "Ridge-Based Vessel Segmentation in Color Images of the Retina," IEEE Transactions on Medical Imaging, vol. 23, No. 4, pp. 501-509, Apr. 2004.

Staal et al., "A Trained Spin-Glass Model for Grouping of Image Primitives", IEEE Transactions on Pattern Analysis and Machine Intelligence, vol. 27, No. 7, pp. 1172-1182, Jul. 2005.

Frangi et al., "Multiscale Vessel Enhancement Filtering," Medical Image Computing and Computer-Assisted Intervention—MICCAI'98, vol. 1496, pp. 130-137, Springer Verlag, Berlin, Germany, 1998.

Su et al., "A New Method for Linear Feature and Junction Enhancement in 2D Images based on Morphological Operation, Oriented Anisotropic Gaussian Function and Hessian Information", Pattern Recognition , vol. 47. pp. 3193-3208, May 9, 2014.

Khan et al., "Vessel Enhancement Using Directional Features", Information Technology Journal, vol. 6, No. 6, pp. 851-857, 2007.

Dehkordi et al., "A Review of Coronary Vessel Segmentation Algorithms", J. Med. Signals Sens. vol. 1, No. 1, pp. 49-54, 2011.

Matei et al., "Vascular Image Processing Using Recursive Directional Filters", World Congress on Medical Physics and Biomedical Engineering, IFMBE Proceedings, vol. 39, pp. 947-950, 2013.

\* cited by examiner

METHOD FOR VESSEL EXTRACTION

BACKGROUND OF THE INVENTION

The present invention relates to the field of computer processing of medical images. More specifically the invention relates methods of detecting low-contrast and narrow width blood vessels in angiographic and retinal images.

Current methods of detecting low-contrast and narrow-width vessels, while avoiding false responses near pathologies and other non-vascular structures, are lacking and insufficient.

Reliable vessel extraction is a prerequisite for subsequent image analysis and processing, especially in the case of retinal and cardiac images. For certain medical diagnostic tasks, it is necessary to measure accurately the width of vessels and their abnormal branching. For example, tracing a vessel with varying width along the way may reveal the signs of stenosis, i.e., narrowing of the vessels. Grading of stenosis is important to diagnose the severity of vascular disease and subsequently determine the treatment therapy. See, for example, *North American Symptomatic Carotid Endarterectomy Trial* (NASCET), Steering Committee, North American symptomatic carotid endarterectomy trial, *Stroke* 22 (1991) 711{720}; and *European Carotid Surgery Trialists Collaborative Group, Randomised Trial Of Endarterectomy For Recently Symptomatic Carotid Stenosis: Final Results of the MRC European Carotid Surgery* (ECST), *Lancet* 351 (1999) 1379{87}.

Planning and performing neurosurgical procedures require an exact insight into the complete blood vessels tree structure. This can be achieved by tracing its variability in terms of width as well as direction.

The techniques published in the research literature in the field of vessel extraction have been based on matched filters, adaptive thresholds, mathematical morphology, and Hessian measures. Recent literature has been dominated by Hessian-based methods due to its successful use in characterizing elongated structure of vessels. One advantage of Hessian base methods is that vessels in a large range of diameters can be captured due to multi-scale analysis. In Hessian based methods, an input image is first convolved with the derivatives of a Gaussian at multiple scales and then the Hessian matrix is analyzed at each pixel in the resulting image to determine the local shape of the structures at that pixel. The ratio between the minimum and the maximum Hessian eigenvalues is small for line-like structures but is high for blob-like ones.

However, processing vessel images which are noisy and suffer from non-uniform illumination have the same limitations which Hessian-based filters suffer from in finding narrow and low-contrast vessels. The reason is that such processing uses the same Hessian eigenvalues to pre-select the vessel-candidate pixels at which the filter is applied. In order to reduce the noise sensitivity of the Hessian-based methods, has been proposed to use it within the framework of the directional filter bank. See P. T. H. Truc, M. A. U. Khan, Y K. Lee, S. Lee, T S. Kim, "Vessel Enhancement Filter Using Directional Filter Bank", Computer Vision and Image Understanding 113 (2009) 101-112. Specifically, the input image is first decomposed by a decimation-free directional filter bank (DDFB) into a set of directional images, each of which contains line-like features in a narrow directional range. The directional decomposition has two advantages. One advantage is that noise in each directional image will be significantly reduced compared to that in the input image due to its random directional nature. The other advantage is that because a directional image contains vessels with similar directions, the Hessian eigenvalue calculation in it is facilitated. Then, distinct appropriate enhancement filters are applied to enhance vessels in the respective directional images. Finally, the enhanced directional images are re-combined to generate the output image with enhanced vessels and suppressed noise. However, since eigen values determination is largely effected by non-uniform illumination patterns, combining directional images for maximizing the vessel extraction is a challenging task. See F. Zana and J.-C. Klein, "Segmentation of vessel-like patterns using mathematical morphology and curvature evaluation," *IEEE Trans. Image Processing*, vol. 10, no. 7, pp. 1010-1019, 2001.

SUMMARY OF THE INVENTION

The present invention provides an improved method of vessel extraction without eigen value involvement. The invention improves on prior processes of detecting low contrast, narrow width blood vessels with the explicit use of elliptical Gaussian derivative in vessel images. The invention also provides an improved process of characterizing blood vessels via angiography while avoiding false responses near pathologies and other non-vascular structures.

The present invention comprises employing multi-scale matched filters instead of multi-scale Hessian-based filtering for vessel detection in each directional image. The method of the invention also comprises combining enhanced directional images together to construct one final enhanced image.

The inventive method overcomes the problems associated with eigen value calculations.

According to the invention, (A) first, an acquired image is obtained and (B) decomposed into a number of directional images with the help of directional filter bank; (C) the directional images are first normalized by removing their mean values, and later on linear scaled; (D) a multi-scale matched filter in the form of second order elliptical derivative Gaussian filters is applied to each of the normalized directional images with a plurality of scales along x and y-direction; (E) the output of the matched filter results in enhance elongated features in each of these directional images; (F) the improved directional images are linearly combined to produce a final enhanced image.

DETAILED DESCRIPTION

Figure 1:
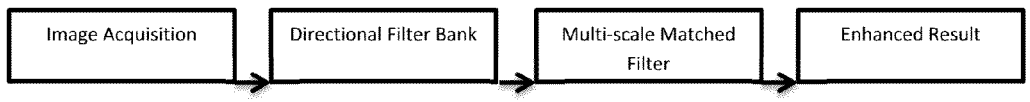
FIG. 1 is a flow chart showing the general process of the invention.

Referring first to the drawings, FIG. 1 is a flow chart showing as the first step acquiring an image from an angioscopy, then applying a directional filter bank to the image, followed by applying a multi-scale matched filter, with the last step being obtaining an enhanced result from the process.

Figure 2:
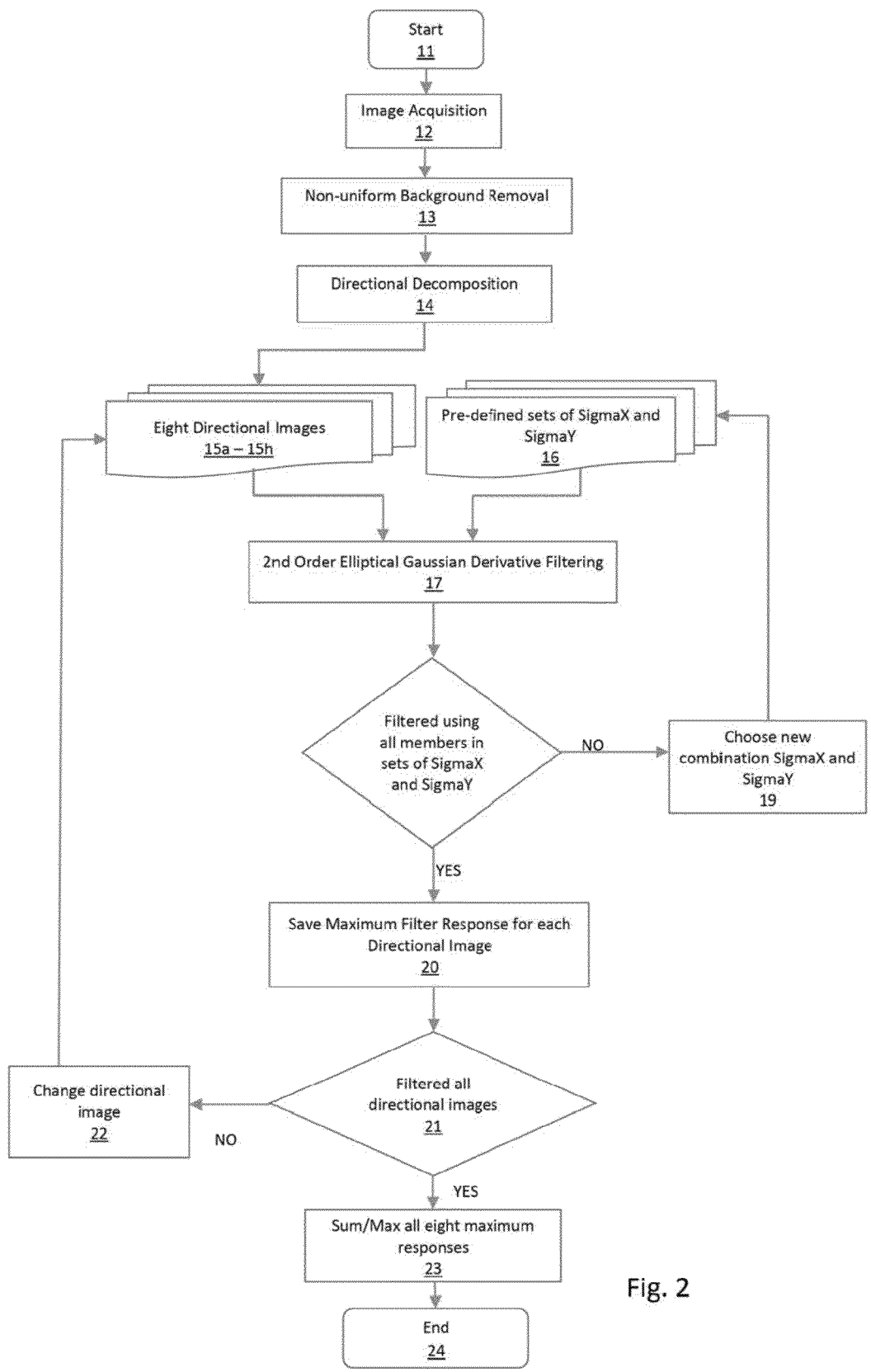
FIG. 2 is a flow chart showing a specific embodiment of the invention.

FIG. 2 is a flow chart of an embodiment of a process according to the invention wherein the process stards 11 with an image acquisition 12 followed by non-uniform background removal 13 and directional decomposition 14. Eight directional images 15a-15h are obtained from the directional decomposition step 14. Second order elliptical gaussian derivative filtering 17 is then applied to the directional images 15a-15h and then filtered using all members in sets of SigmaX 18. For members which do not pass the filter step 18, a new SigmaX and SigmaY is chosen 19 and then pre-defined sets of SigmaX and SigmaY 16 are used for $2^{nd}$ order elliptical Gaussian Derivative Filtering 17.

For members which pass filter step 18, maximum filter response for each directional image is saved 20 and then all directional images are filtered 21. For images which do not pass filter step 21, the directional image is changed 22 and then eight directional images 15a-15h are obtained again. For images which pass filter step 21, all eight maximum responses are summed/maxed 23 and the process ends 24 with an enhanced image.

Figure 3:
FIG. 3 is an original retinal image displaying a wide variety of vessels.
Figure 4:
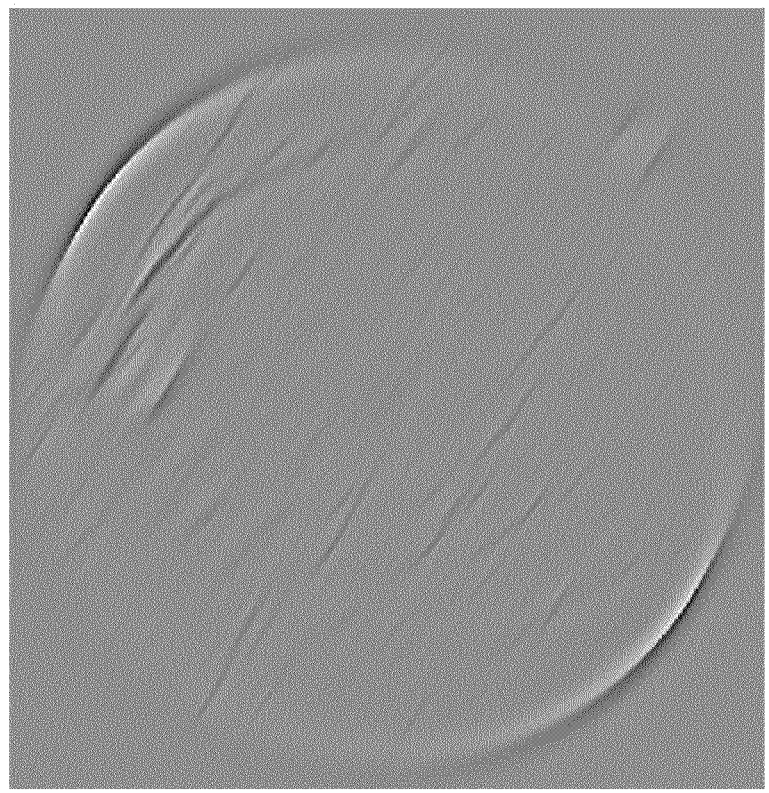
FIG. 4 is one of eight directional images displaying vessels having 45 degree orientations.
Figure 5:
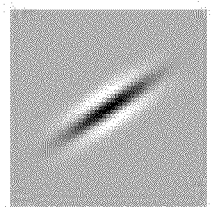
FIG. 5 is a second-order Elliptical Gaussian Derivative Filter with Sigma in x-direction=2, and Sigma in y-direction=8.
Figure 6:
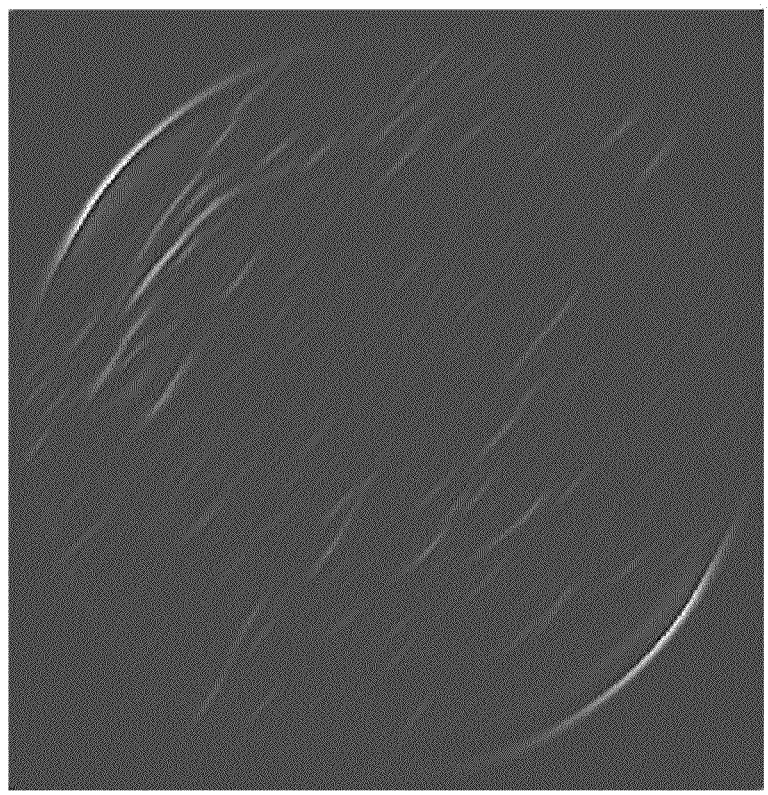
FIG. 6 is a directional image enhanced with second-order elliptical gaussian filter.
Figure 7:
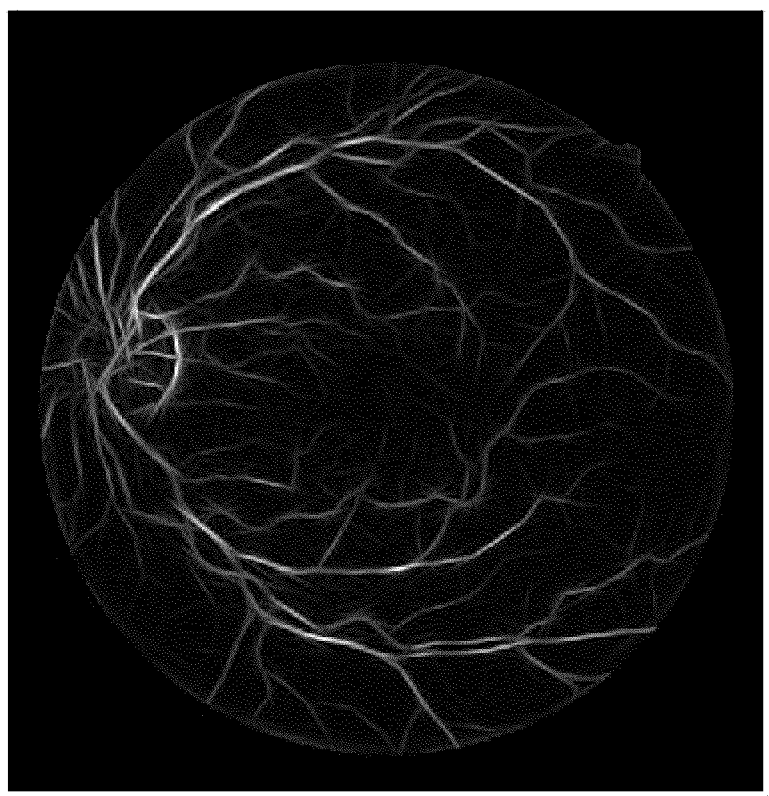
FIG. 7 is a final enhanced image which accumulates the maximum response from all eight directional images.
Figure 8:
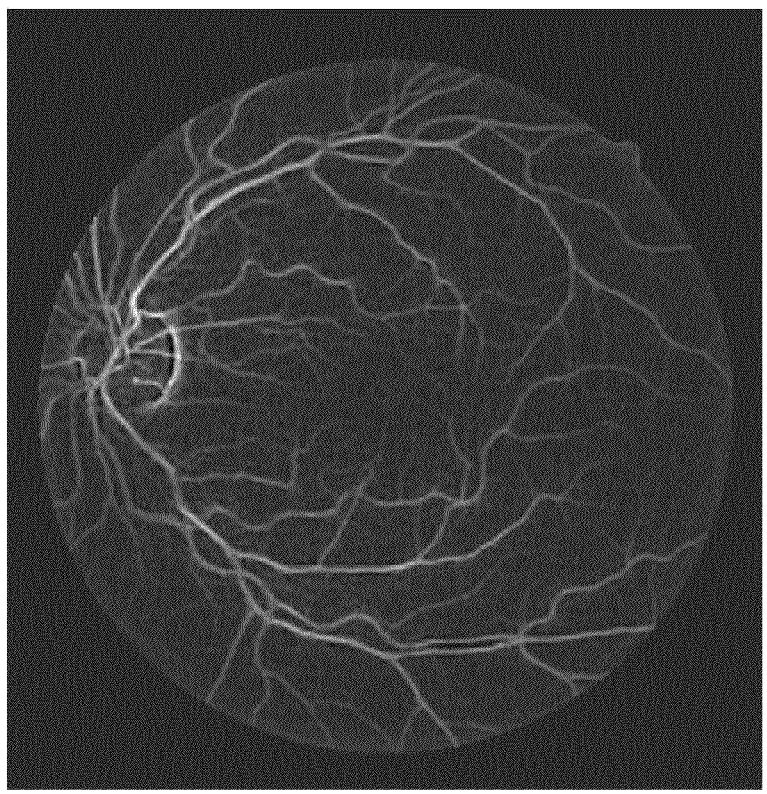
FIG. 8 is a final enhanced image which sums over the best responses from the directional images.

FIGS. 3-8 are photographic representations wherein FIG. 3 is an original retinal image displaying a wide variety of vessels. FIG. 4 is one of eight directional images displaying vessels having 45 degree orientations. FIG. 5 is a second-order Elliptical Gaussian Derivative Filter with Sigma in x-direction=2, and Sigma in y-direction=8. FIG. 6 is a directional image enhanced with second-order elliptical gaussian filter. FIG. 7 is a final enhanced image which accumulates the maximum response from all eight directional images, and FIG. 8 is a final enhanced image which sums over the best responses from the directional images.

The method of vessel extraction of the invention comprises (a) acquiring an angiography image; (b) decomposing the acquired angiography image into at least two directional images with a directional filter bank; (c) normalizing the directional images by removing their mean values and then scaling linearly; (d) applying second derivative Gaussian filters to each of the directional images using a combination of scales along x and y-direction such as to create an elliptical support for the resulting filter; (e) combining the resultant directional images into a final enhanced image.

Preferably the method comprises characterizing a specific width and direction of a vessel. Elliptical support regions for second order Gaussian derivatives can be used.

The method can be carried out with a specially programmed computer which in preferred embodiments provides a value to a standard deviation parameter in a horizontal direction and providing a value to a standard deviation parameter in a vertical direction, resulting in a multi-scale anisotropic second-order Gaussian derivative filter.

The derivatives along x and y direction of conventional Gaussian filters are known as Gaussian derivatives filters.

Each of the directional images are associated with a single directional features in the method.

Advantageously the directional filter bank is decimation-free and provides pure directional decomposition of the features based on their orientations only without disturbing the frequency composition of the features.

The method comprises applying anisotropic (elliptical) multi-scale second order Gaussian derivatives within a directional filter bank framework.

The present invention, therefore, is well adapted to carry out the objects and attain the ends and advantages mentioned, as well as others inherent therein. While the invention has been depicted and described and is defined by reference to particular preferred embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described preferred embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A method of vessel extraction comprising (A) acquiring an image; (B) decomposing the acquired image into a number of directional images with a directional filter bank; (C) normalizing the directional images by removing their mean values and then linear scaling to produced normalized directional images; (D) applying a multi-scale matched filter in the form of second order elliptical derivative Gaussian filters to the normalized directional images with a plurality of scales along x and y-direction; (E) obtaining directional images with enhanced elongated features in each of the directional images from the output of the matched filter; (F) linearly combining the resultant improved directional images to produce a final enhanced image.

2. The method of claim 1 further comprising characterizing a specific width and direction of a vessel.

3. The method of claim 1 further comprising using elliptical support regions for second order Gaussian derivatives.

4. The method of claim 1 comprising providing a value to a standard deviation parameter in a horizontal direction and providing a value to a standard deviation parameter in a vertical direction, resulting in an anisotropic Hessian Matrix.

5. The method of claim 1 wherein the Gaussian filters are Gaussian derivatives.

6. The method of claim 1 wherein each of the directional images are associated with a single direction.

7. The method of claim 1 wherein the directional filter bank is decimation free and provides pure directional decomposition caring for feature orientations only.

8. The method of claim 1 comprising applying anisotropic multi-scale second order Gaussian derivatives within a directional filter bank framework.

* * * * *